(12) United States Patent
Jin et al.

(10) Patent No.: US 6,326,685 B1
(45) Date of Patent: Dec. 4, 2001

(54) LOW THERMAL EXPANSION COMPOSITE COMPRISING BODIES OF NEGATIVE CTE MATERIAL DISPOSED WITHIN A POSITIVE CTE MATRIX

(75) Inventors: Sungho Jin, Millington; Hareesh Mavoori, Berkeley Heights, both of NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/072,248

(22) Filed: May 4, 1998

(51) Int. Cl.$^7$ .............................. H05K 7/20; B32B 13/00; B32B 17/06; C03C 22/02; B22F 7/00

(52) U.S. Cl. .................... 257/706; 257/703; 257/758; 257/762; 257/764; 257/763; 257/765; 252/766; 252/770; 252/771; 252/702; 252/200; 252/701; 428/616; 428/618; 428/620; 428/615; 428/637; 428/639; 428/644; 428/650; 428/652; 428/653; 428/663; 428/664; 428/674; 428/668; 428/671; 428/661; 428/660

(58) Field of Search .................... 257/706, 758, 257/762, 744, 763, 765, 766, 770, 771, 700, 701, 702, 703; 428/615, 616, 618, 620, 621, 687, 637, 639, 644, 650, 651, 653–658, 660–664, 668, 671, 674, 675

(56) References Cited

U.S. PATENT DOCUMENTS

| | | | |
|---|---|---|---|
| 3,768,985 | * 10/1973 | Woodward | 29/191 |
| 4,398,659 | * 8/1983 | Richter | 228/124 |
| 4,559,277 | * 12/1985 | Ito | 428/627 |
| 4,690,999 | * 9/1987 | Numata et al. | 528/188 |
| 4,729,504 | * 3/1988 | Edamura | 228/122.1 |
| 4,763,828 | * 8/1988 | Fukaya et al. | 228/124.1 |
| 4,792,476 | * 12/1988 | Numata et al. | 428/209 |
| 4,895,765 | * 1/1990 | Sue et al. | 428/627 |
| 5,045,922 | * 9/1991 | Kodama et al. | 257/698 |
| 5,076,863 | * 12/1991 | Taniguti et al. | 148/528 |
| 5,106,433 | * 4/1992 | Nakamura et al. | 428/675 |
| 5,126,618 | * 6/1992 | Takahashi et al. | 310/346 |
| 5,224,017 | * 6/1993 | Martin | 361/388 |
| 5,259,885 | * 11/1993 | Sandhage | 148/282 |
| 5,358,795 | * 10/1994 | Nakamura et al. | 428/675 |
| 5,382,309 | * 1/1995 | Seibold et al. | 156/242 |
| 5,481,136 | * 1/1996 | Kohmoto et al. | 257/712 |
| 5,526,867 | * 6/1996 | Keck et al. | 174/523 |
| 5,527,442 | * 6/1996 | Sekhar et al. | 428/660 |
| 5,529,740 | * 6/1996 | Jester et al. | 264/317 |
| 5,580,833 | * 12/1996 | Fu et al. | 501/87 |
| 5,585,165 | * 12/1996 | Kennedy et al. | |
| 5,682,594 | * 10/1997 | Kennedy et al. | 428/549 |
| 5,703,202 | * 12/1997 | Jester et al. | 528/481 |
| 5,711,763 | * 1/1998 | Nonami et al. | 623/16 |
| 5,718,979 | * 2/1998 | Marker et al. | 428/426 |
| 5,730,920 | * 3/1998 | Marshall et al. | 264/214 |
| 5,789,060 | * 8/1998 | Marshall et al. | 428/116 |
| 5,906,897 | * 5/1999 | Tanaka et al. | 428/651 |
| 5,922,479 | * 7/1999 | Taniguchi et al. | 428/674 |
| 5,981,025 | * 11/1999 | Marshall et al. | 428/116 |
| 5,981,314 | * 11/1999 | Glenn et al. | 438/127 |
| 6,011,693 | * 1/2000 | Gore | 361/760 |
| 6,099,974 | * 8/2000 | Lenling | 428/674 |

\* cited by examiner

Primary Examiner—Alexander O. Williams
(74) Attorney, Agent, or Firm—Lowenstein Sandler PC

(57) ABSTRACT

A reduced CTE composite structure is made by providing a matrix material whose CTE is to be reduced, adding negative CTE bodies to the matrix material and mechanically coupling the matrix material to the negative CTE bodies as by deforming the composite structure. A preferred application is to make an improved composite material for use as a heat sink for semiconductor substrates with a minimum of thermal expansion mismatch.

10 Claims, 5 Drawing Sheets

US 6,326,685 B1

LOW THERMAL EXPANSION COMPOSITE COMPRISING BODIES OF NEGATIVE CTE MATERIAL DISPOSED WITHIN A POSITIVE CTE MATRIX

FIELD OF THE INVENTION

This invention relates to articles comprising low thermal expansion composite materials and their manufacture, in particular, those composites containing components, such as ductile alloy bodies, with negative coefficients of thermal expansion.

BACKGROUND OF THE INVENTION

Electronic devices and their package structures consist of a variety of metallic, ceramic, plastic or composite components with vastly different coefficients of thermal expansion (CTE). Mechanical or electrical failures in such devices are often caused by thermal expansion mismatch among the materials during fabrication or service. High thermal conductivity materials such as Cu and Al, and their alloys, are commonly used as heat sink materials in high-density, high-power-dissipating electronic packages. Differences in coefficients of thermal expansion (CTEs) between the heat sink material (e.g. 15–18 ppm/° C. for Cu and its alloys, 22–25 ppm/° C. for Al and its alloys, and about 8 ppm/° C. for the commonly used "low-expansion" 25% Cu-75% W composite) and the silicon chip (2.8–4.2 ppm/° C.) to which it is attached can cause stresses in the electronic package leading to complex thermal stress failure mechanisms. These thermomechanical problems can be thermoelastic, thermoplastic and elastoplastic deformations involving time-dependent and dynamic processes like stress rupture, thermal shock, thermal fatigue, creep and stress relaxation, and can seriously impair the reliability of the device. The thermal stresses induced by CTE mismatches can cause p-n junction failure in chips, brittle fracture in Si, Ga—As, or other semiconductor substrates, bowing or delamination of the layered assembly and stress corrosion failure in metals. Therefore, minimizing the mismatch between the heat sink material and semiconductor substrates can lead to significantly greater device reliability.

It is desirable to have heat sink materials with low CTE values, e.g., $\alpha \sim 4$ ppm/° C., nearly matching that of silicon, or $\alpha \sim 6$ ppm/° C., nearly matching that of Ga—As. Composite structures with low CTEs, e.g., layered configurations consisting of copper and low CTE materials such as tungsten ($\alpha \sim 4.5$ ppm/° C.), molybdenum ($\alpha \sim 5.2$ ppm/° C.), or Invar (Fe-36 w % Ni, $\alpha \sim 1.2$ ppm/° C.) have been demonstrated. See, for example, Zweben et al, *Electronic Materials Handbook*, Vol. 1: Packaging (ASM, Metals Park, Ohio, 1989), p. 1129. However, the volume fraction of the non-copper metallic element generally needs to be substantial, e.g. of the order of 60–90 volume %, to significantly reduce the CTE value of copper, thereby reducing the efficiency of the heat sink.

Accordingly, there is a need for improved composite materials, especially those which can act as a heat sink for semiconductor substrates with a minimum of thermal mismatch.

SUMMARY OF THE INVENTION

In accordance with the invention, a reduced CTE composite structure is made by providing a matrix material whose CTE is to be reduced, adding negative CTE bodies to the matrix material and mechanically coupling the matrix material to the negative CTE bodies as by deforming the composite structure. A preferred application is to make an improved composite material for use as a heat sink for semiconductor substrates with a minimum of thermal expansion mismatch.

BRIEF DESCRIPTION OF THE DRAWINGS

The advantages, nature and additional features of the invention will appear more fully upon consideration of the illustrative embodiments and experimental data described in the accompanying drawings. In the drawings.

It is to be understood that the drawings are for purposes of illustrating the concepts of the invention and, except for the graphs, are not to scale.

DETAILED DESCRIPTION

Figure 1:
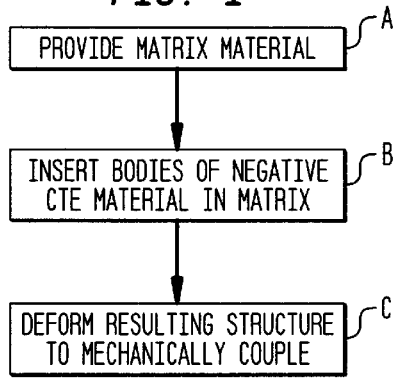
FIG. 1 is a block diagram of the steps involved in making a reduced CTE composite structure.
Figure 2A:
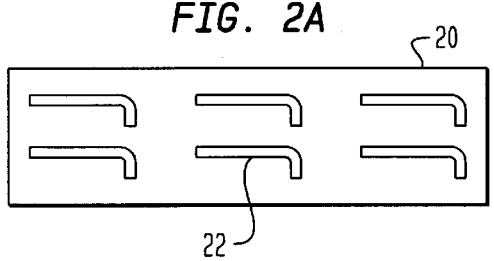
FIGS. 2A–2F schematically illustrate typical shaped negative CTE bodies added to matrix material.
Figure 2B:
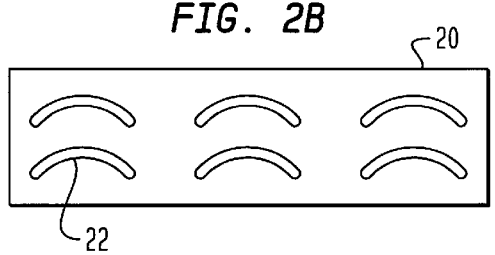
Figure 2C:
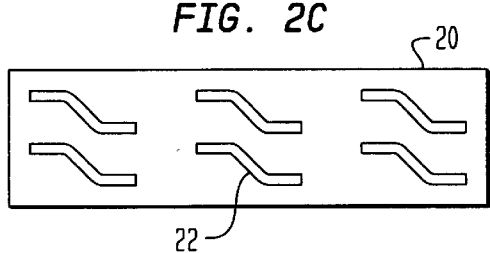
Figure 2D:
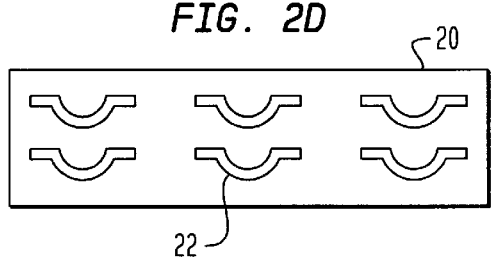
Figure 2E:
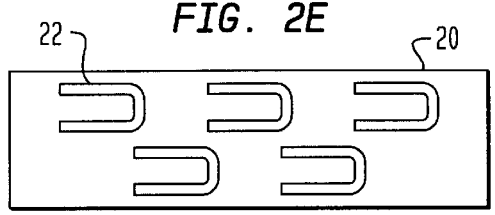
Figure 2F:
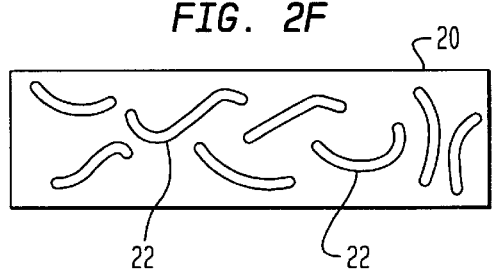

Referring to the drawings, FIG. 1 is a block diagram of the steps involved in exemplary process for making a reduced CTE composite structure. The first step shown in block A is to provide a matrix material whose CTE in one or more dimensions is to be constrained. The matrix material will typically have a positive CTE. The matrix material can be a metal, polymer, plastic, ceramic, glass or epoxy material. In a preferred application it is a metal, such as copper, having desirable heat sink properties but an undesirably large CTE for important applications. The matrix material can be a block with machined holes, a porous block or even a collection of rods or an aggregation of powder.

The next step shown in block B is to add, within the matrix material, bodies of a negative CTE material. This can be accomplished in a variety of ways. If the matrix has machined holes, the negative CTE material can be added as rods, bars, strips or wires. Preferably the bodies are roughened, shaped or serrated to facilitate strong mechanical coupling with the matrix material. Roughness or serrations can be produced by machining, grinding, shot blasting, patterned etching or the like. If the matrix material is a powder, the low CTE material can be added as shaped bodies or a powder.

The negative CTE material advantageously has a large negative CTE of at least (in a negative value) –0.1 ppm/° C., preferably at least –5 ppm/° C., even more preferably at least –20 ppm/° C. An example of such an advantageous alloy is Ni—Ti with a composition near 56 wt % Ni and 44% Ti.

The desirable serration or roughness on the surface of the negative CTE bodies has a depth of at least 1% of the thickness or width of the negative CTE body, and preferably at least 5% of the thickness or the width. Alternatively, one can use a geometrically nonlinear (bent) configuration of the negative CTE rods, wires or flakes. Desirably, at least a portion of the length of the negative CTE body is bent by at least 20 degrees in at least one location. The bending can be straight, curved, random or a mixture of these in any given composite. Such a bent configuration provides enhanced mechanical coupling of the two materials during thermal expansion or contraction of the composite. FIGS. 2A through 2F illustrate typical bodies of matrix material 20 to which shaped negative CTE bodies 22 have been added.

Figure 3:
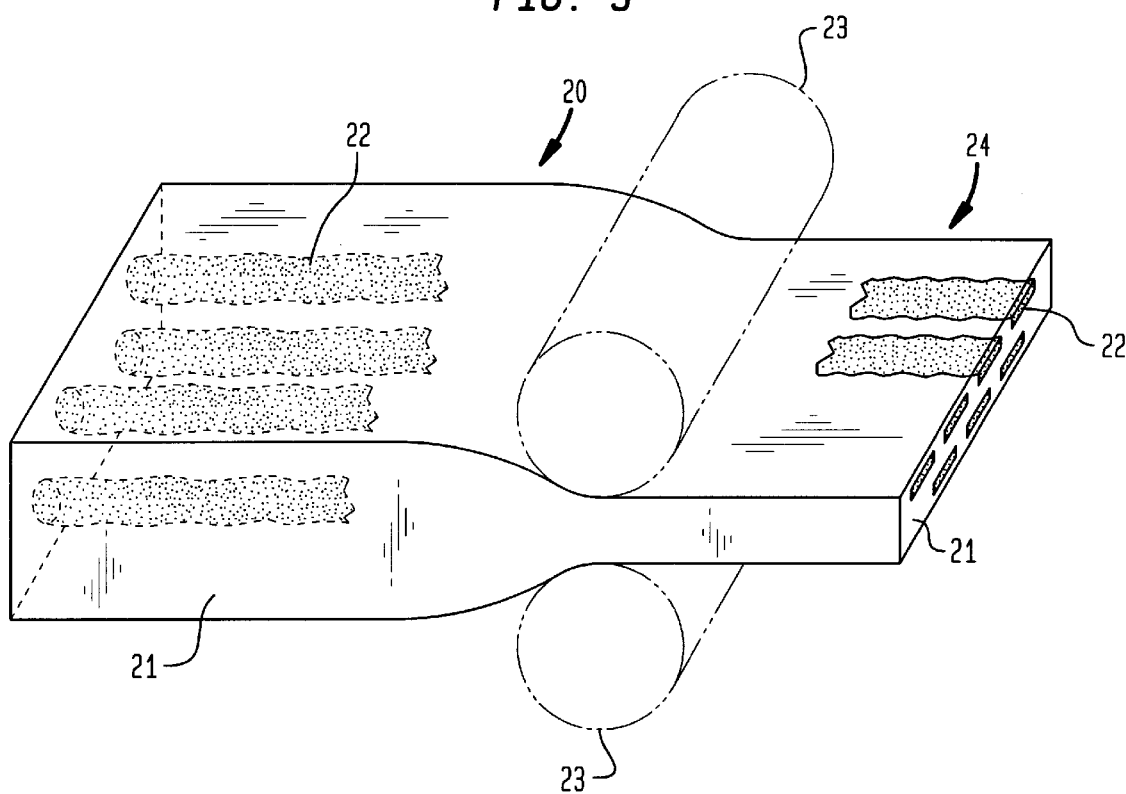
FIG. 3 illustrates deforming a composite body using a roller mill.

The third step (block C) is to mechanically couple the matrix material with the negative (TE material so as to reduce the CTE of the composite structure. The mechanical coupling can be achieved by mechanical deformation of the composite structure. Compressive deformation provides compaction, reduced dimension and ensures strong mechanical coupling of the component materials. For example, a matrix body containing serrated rods can be plastically deformed as by press-forming or plate rolling. FIG. 3 illustrates the step whereby a composite body 20 of matrix material 21 and negative CTE bodies 22 is deformed by the rollers 23 of a rolling mill to produce a composite structure 24 with strong mechanical coupling between the components.

Figure 4:
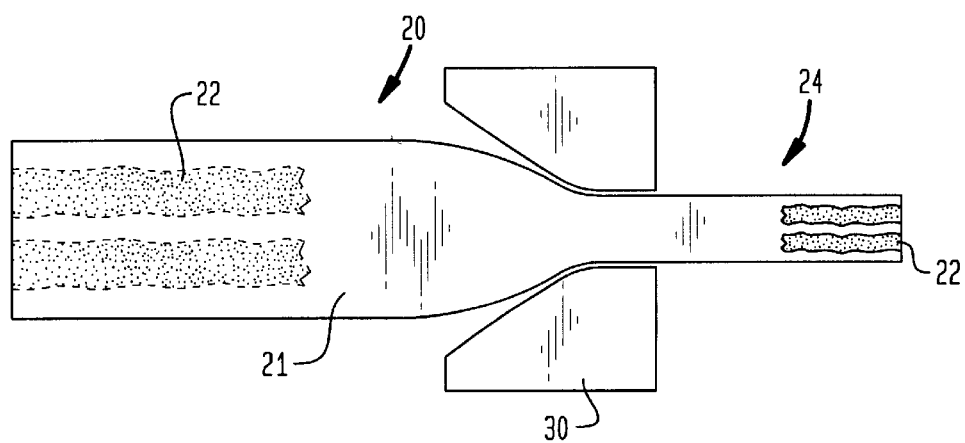
FIG. 4 illustrates deforming using a drawing die.

Alternatively, the structure can be deformed by rod processing such as swaging, rod rolling or wire drawing. FIG. 4 shows deformation wherein the composite body 20 is deformed by a size reducing drawing die 30.

If the matrix material is not plastically deformable as in the case of polymer, plastic, ceramic or epoxy glass material, a tight coupling can be achieved using thermal differential contraction, e.g., by inserting the negative CTE body into holes in the matrix material at a temperature higher than the maximum anticipated service temperature (preferably 50° C. higher). During cooling, the matrix material will shrink while the negative CTE body will expand, leading to mechanical locking. Curing or solidification of liquid matrix (e.g., uncured epoxy) with the negative CTE bodies embedded therein will produce a similar locking effect.

Figure 5:
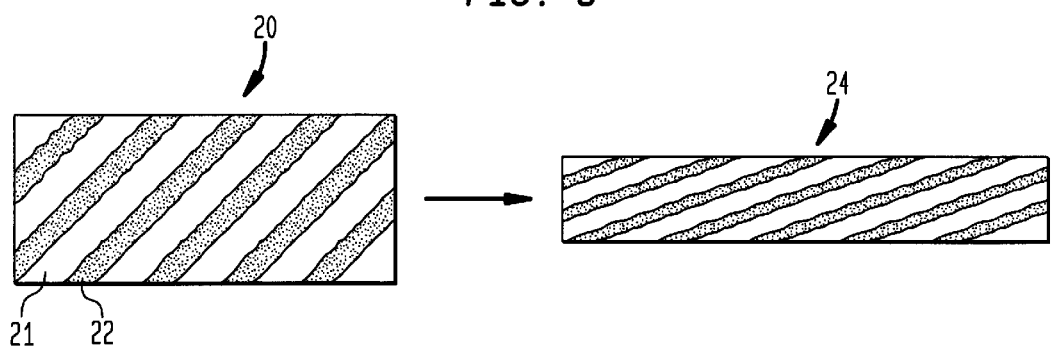
FIG. 5 illustrates production of a composite structure having reduced CTE in two or three dimensions.

The composite material containing the negative CTE bodies is expected to have highly anisotropic mechanical and thermal expansion properties. The CTE reduction occurs in the direction of alignment of the negative CTE bodies, and hence they are preferably arranged along the direction of thermal expansion to be managed. If a two-dimensional, three-dimensional, or isotropic reduction of CTE is needed, the negative CTE bodies can be arranged either at an inclined angle or a diagonal angle (in a three-dimensional rectangular body). Subsequent deformation and compaction will result in either two-dimensional (x–y, y–z, x–z) or three-dimensional (x–y–z) reduction the CTE of the matrix material. FIG. 5 illustrates the effect of deformation on a composite body 20 with inclined bodies 22 to produce a composite structure 24 having reduced CTE in at least two dimensions.

Instead of inserting rods of the negative CTE material in the matrix preform, a multitude of rods, bars or strips of matrix material (positive CTE elements) and rods, bars or strips of negative CTE material can be bundled together, placed in a metallic jacket, e.g. of the positive CTE material, and uniaxially deformed by rod drawing, swaging, rolling, etc.

Figure 6A:
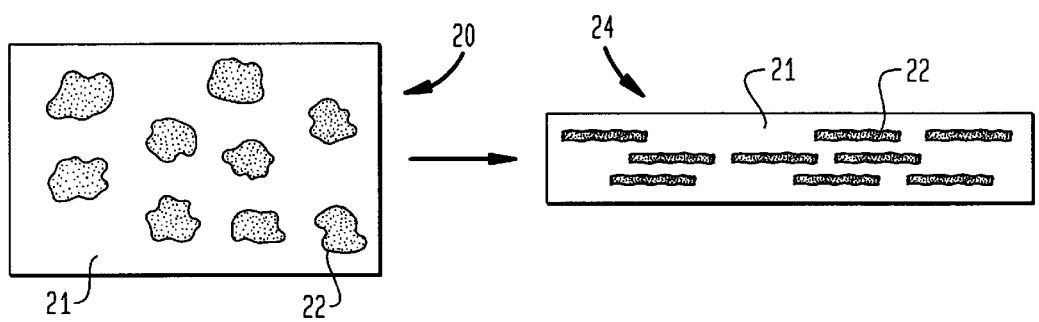
FIGS. 6A and 6B illustrate deformation of powdered composite bodies.
Figure 6B:
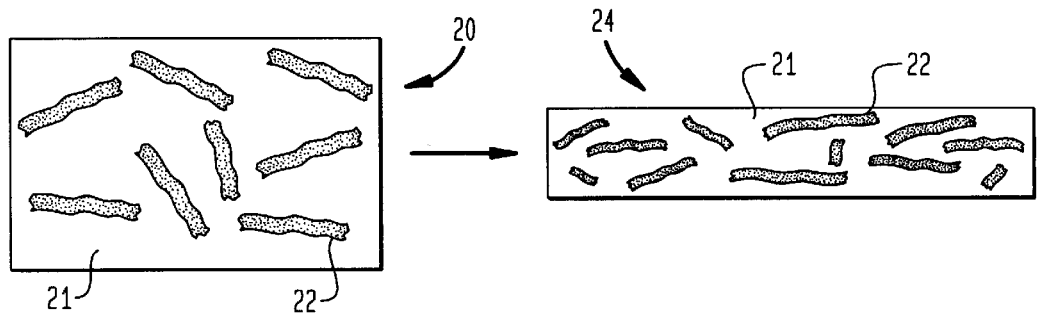

Yet another method of fabricating the composite structure is to use a powder metallurgy processing. For example, powders of Cu and powders of the negative CTE material (e.g. Ti—Ni) can be co-compacted, sintered, or uniaxially deformed (by rolling or rod drawing and roll flattening) to produce a composite with anisotropically reduced CTE. A random distribution of elongated particles or short fibers in the preform produces, after deformation, nearly isotropic CTE reduction. The composite structure as processed by plastic deformation may be given a post-annealing heat treatment, if desired, to relieve residual stress. FIG. 6A illustrates deformation of a powdered composite body 20 to produce a composite structure 24 of anisotropic CTE. FIG. 6B illustrates deformation to produce a structure 24 of isotropic CTE.

Figure 7:
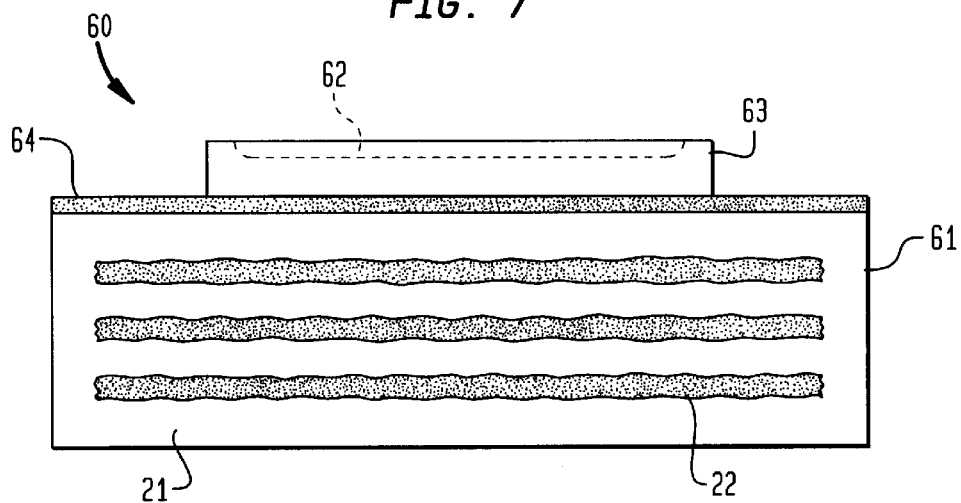
FIG. 7 illustrates a semiconductor device having an improved heat sink.

FIG. 7 illustrates the preferred application of the invention to produce a semiconductor device 60 with an improved heat sink 61. The semiconductor device 60 can comprise a microelectronic circuit or an active optical device 62 on a semiconductor substrate 63. The heat sink 61 can be fabricated in accordance with the process of FIG. 1 to closely match the thermal properties of the semiconductor substrate 62. The substrate 62 is attached to the heat sink 61 as by a thin layer 64 of solder or epoxy.

The preferred composition range of the Ni—Ti based negative CTE body is typically about 48–64 weight % Ni, with the balance Ti, and preferably 52–60% Ni, with the balance Ti. Othier alloying elements such as V, Cr, Mn, Fe, Co, Mo, Nb, Ta, W, Pd, Cu, and Zn may also bel present in an amount less than 5 wt %, as long as the temperature range of phase transformation is near ambient temperature, e.g., between −150° to +150° C. range, and preferably in the −200° to +200° C. range. Other alloys with phase transformation occurring near ambient temperature may also be used, for example, Cu—Al—Zn (1–10 wt % Al, 20–40% Zn, balance Cu), Au—Cu—Zn (10–30% Cu, 20–40% Zn, balance Au), Cu—Zn—Si (30–40 wt % Zn, 0–20% Sn, balance Cu), Cu—Al—Ni (10–20% Al, 1–5% Ni, balance Cu), Cu—Zn—Sn (30–45% Zn, 0–20% Sn, balance Cu), and Cu—Sn (20–30% Sn, balance Cu).

For a desirably large coefficient of thermal expansion, the phase transformation near ambient temperature (e.g. at the −150° to +150° C. range, and preferably in the −200° to +200° C. range) is advantageous. It has been found that a large negative CTE in a desirably wiide temperature range (e.g. at least over 100° C. range near room temperature) is more easily obtained in these materials if uniaxial tensile deformation, such as wire drawing or rod drawing, is used. The exact mechanism for this behavior is not clearly understood. The desired uniaxial deformation is at least 2% elongation in length, preferably 5% or more elongation, even more preferably 10% or more.

The invention can be more clearly understood by consideration of the following specific examples.

EXAMPLE 1

For the fabrication of a Cu composite with a reduced CTE, a Ti—Ni alloy rod with a nominal composition of 56% Ni and 44% Ti (wt %) was wire drawn to a diameter of 2.16 mm and was used as the negative CTE body. The Ti—Ni rod was inserted into a copper tube (~4.8 mm OD and ~3.2 mm ID) and these were swaged together using 4.24 mm, 3.76 mm, and 3.35 mm diameter dies successively. Before swaging, shallow circumferential notches spaced about 0.5–1 mm apart were cut on the surface of the Ti—Ni rods with a rotary carbide tool to improve interlocking with the Cu during swaging. The resulting composite structure consisted of a Ti—Ni alloy core with a tight cladding of Cu around it. The volume fraction ($V_f$) of the Ti—Ni in the composite was estimated to be ~0.35. The composite rod was cut into specimens measuring 3 mm in length for dilatometry. A Netzsch (Model 402 E) dilatometer with a fused silica push rod and type-J thermocouples was used for studying the thermal expansion characteristics. Heating was at a rate of 5° C./min. and cooling was through forced air convection.

Figure 8:
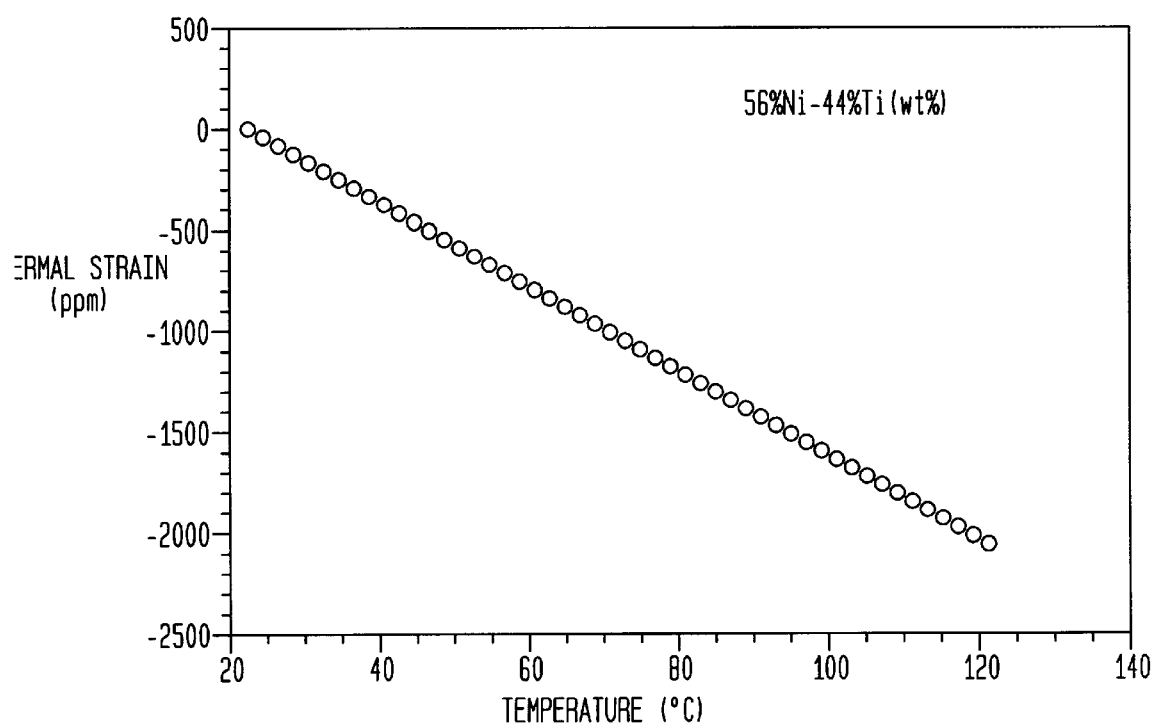
FIG. 8 shows the thermal expansion curve of a first exemplary material.

Shown in FIG. 8 is the thermal expansion curve for the 56% Ni-44% Ti (wt %) alloy rod. The material exhibits a negative CTE value between 25° C. and 100° C. of about −21 ppm/° C. and an average CTE between −100 to +100° C. of about −19 ppm/° C. The thermal expansion behavior of FIG. 8 is quite reproducible upon subsequent temperature cycling after initial stabilization cycling of a few times, with a variation of less than about ±10%.

Figure 9:
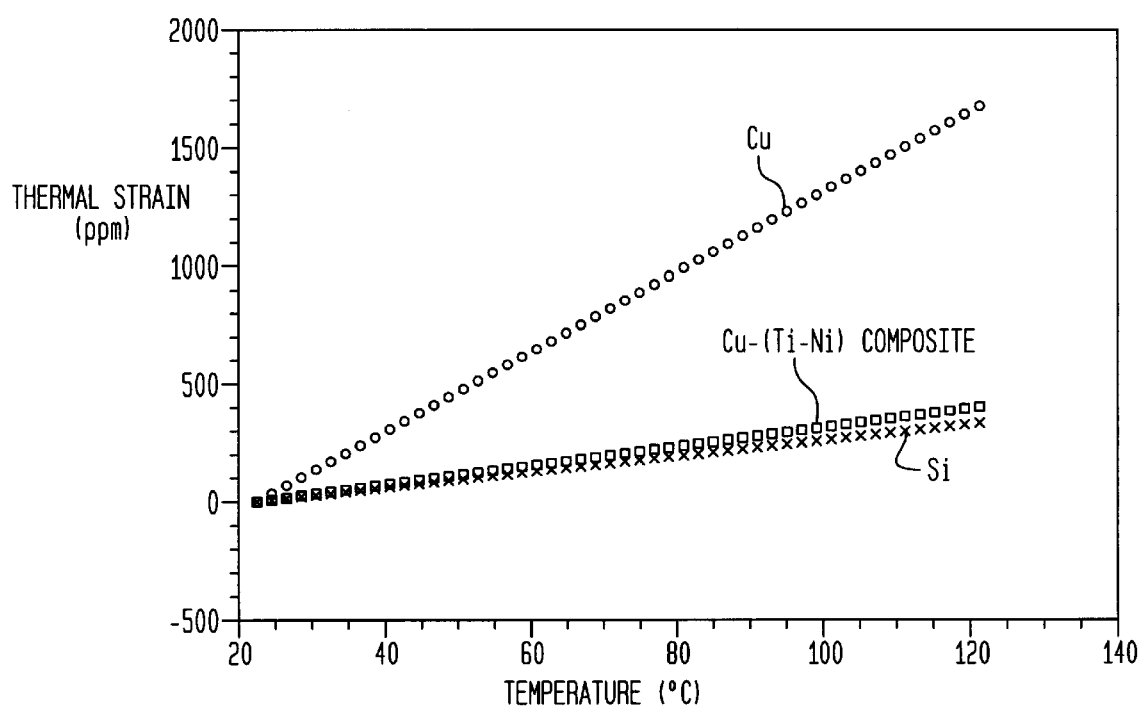
FIG. 9 is a thermal expansion curve for an exemplary composite structure.

Shown in FIG. 9 is the thermal expansion curve for the Cu—(Ti—Ni) composite rod with ~65%, by volume of Cu ($\alpha$~17 ppm/° C.) and 35% of the negative CTE ($\alpha$~−21 ppm/° C.) Ti—Ni alloy. Also shown are the thermal expansion curves for Si and Cu for comparison. The composite material, in the temperature range of 25–100° C., exhibits a low average CTE value of $\alpha$~4 ppm/° C. This CTE value of ~4 ppm/° C. is generally consistent with the calculated value of the composite of the positive expansion matrix Cu and the negative expansion Ti—Ni core, i.e., $$\alpha(\text{composite}) = (17 \text{ ppm/}° \text{C.} \times 0.65) + (-21 \text{ ppm/}° \text{C.} \times 0.35) = +3.7 \text{ ppm/}° \text{C.}$$

$$\alpha(\text{composite}) = (17 \text{ ppm/}° \text{C.} \times 0.65) + (-21 \text{ ppm/}° \text{C.} \times 0.35) = +3.7 \text{ ppm/}° \text{C.}$$

As is evident in the figure, the composite Cu material exhibits a much reduced CTE, almost comparable to that of Si. The thermal conductivity of the composite structure is expected to be a geometrical average of the two constituent materials (Cu and Ti—N), and is calculated to be $$[(398 \text{ W/m.K}) \times 0.65] + [(14 \text{ W/m.K}) \times 0.35] = 263.6 \text{ W/m.K.}$$

A further advantage of the inventive composite materials is that because of the use of negative CTE bodies, a relatively large volume fraction of the matrix Cu of Al can be utilized as compared to the prior art composites utilizing zero CTE (e.g., Invar) or low CTE (e.g., W) elements. Accordingly, the inventive composites provide high thermal conductivity, which is desirable for thermal management applications. Because of the continuity in the Cu matrix material, it is expected that in a multi-filamentary distribution of the negative CTE bodies, the thermal conductivity and electrical conductivity of the composite is not likely to be highly anisotropic especially because of the dominance of Cu conductivity. Even higher thermal conductivity is expected in the inventive composites if Cu-based negative CTE elements such as Cu—Al—Zn alloys are used. The inventive low-CTE composites desirably have thermal conductivity of at least 45% of that of the matrix material, and preferably at least 60% of the matrix conductivity.

It is to be understood that the above described embodiments illustrate only a few of the many possible specific embodiments of the invention. Numerous variations can be made without departing from the spirit and scope of the invention.

What is claimed is:

1. A composite structure comprising:

a matrix material having a positive coefficient of thermal expansion (CTE); and disposed within said matrix material, a plurality of bodies of a material having a negative coefficient of thermal expansion comprising an alloy selected from the group consisting of Ni—Ti, Cu—Al—Ni, Cu—Zn—Al, Au—Cu—Zn, Cu—Zn—Si, Cu—Zn—Sn and Cu—Sn, said bodies mechanically coupled to said matrix material whereby said composite structure exhibits in at least one direction a reduced coefficient of thermal expansion as compared with said matrix material.

2. A composite structure of claim 1 wherein said matrix material comprises a material selected from the group consisting of metal, ceramic, glass, polymer and plastic.

3. A composite structure of claim 1 wherein said matrix material comprises a metal selected from the group consisting of copper and aluminum.

4. A composite structure of claim 1 wherein said negative CTE material comprises a material having a CTE of less than minus 0.1 ppm/° C.

5. A composite structure of claim 1 wherein said negative CTE material is a material which undergoes a crystal structure change within the temperature range ±200° C.

6. A composite structure of claim 1 wherein the CTE of said composite structure is reduced by at least 10% in at least one direction as compared with the CTE of said matrix material.

7. The composite structure of claim 1 wherein said composite structure has a thermal conductivity of at least 45% of the thermal conductivity of said matrix material.

8. The composite structure of claim 1 wherein a plurality of said bodies have serrated or roughened surfaces to enhance mechanical coupling with said matrix material.

9. The composite structure of claim 1 wherein said bodies are arranged within said matrix material at angles to provide said composite structure with a reduction of CTE in at least two dimensions.

10. The composite structure of claim 1 wherein said bodies are shaped to enhance mechanical coupling with said matrix material.

* * * * *